June 27, 1939.  L. J. PFISTER  2,163,850
AGRICULTURAL MACHINE
Filed Sept. 13, 1938  3 Sheets-Sheet 1
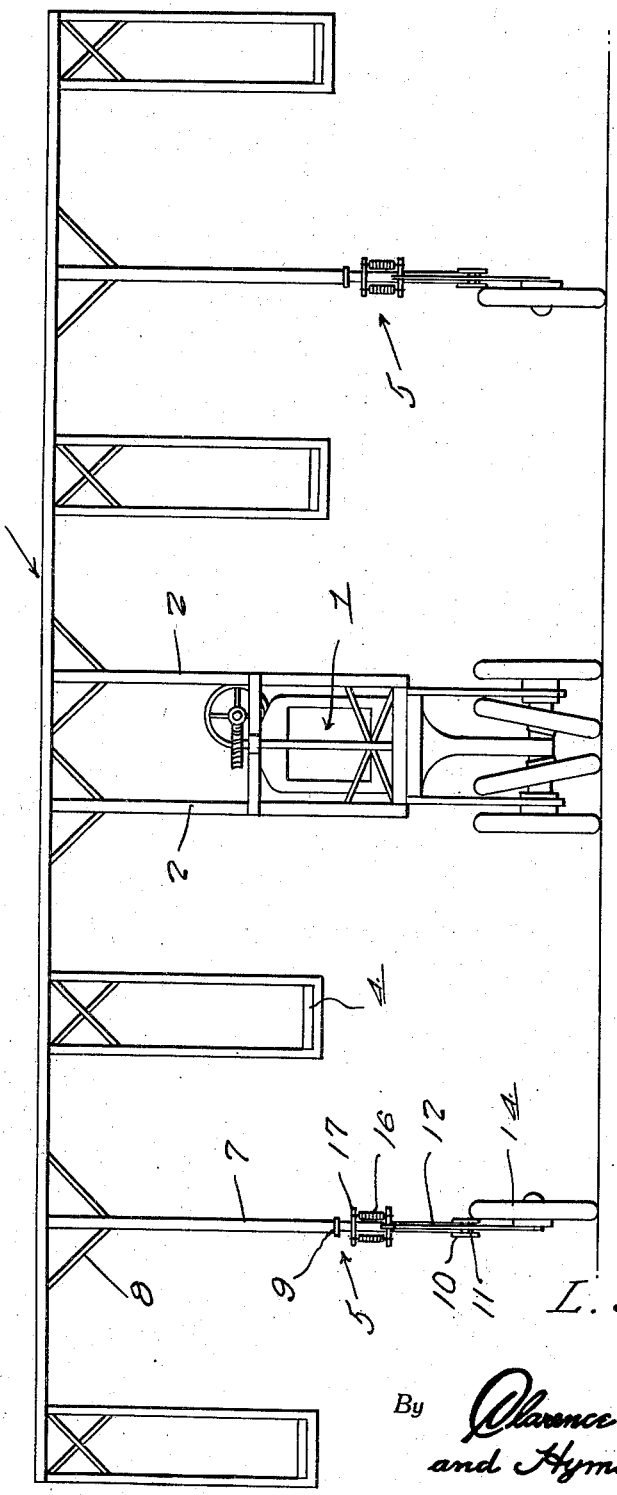
Inventor
L. J. Pfister
By Clarence A. O'Brien
and Hyman Berman
Attorneys

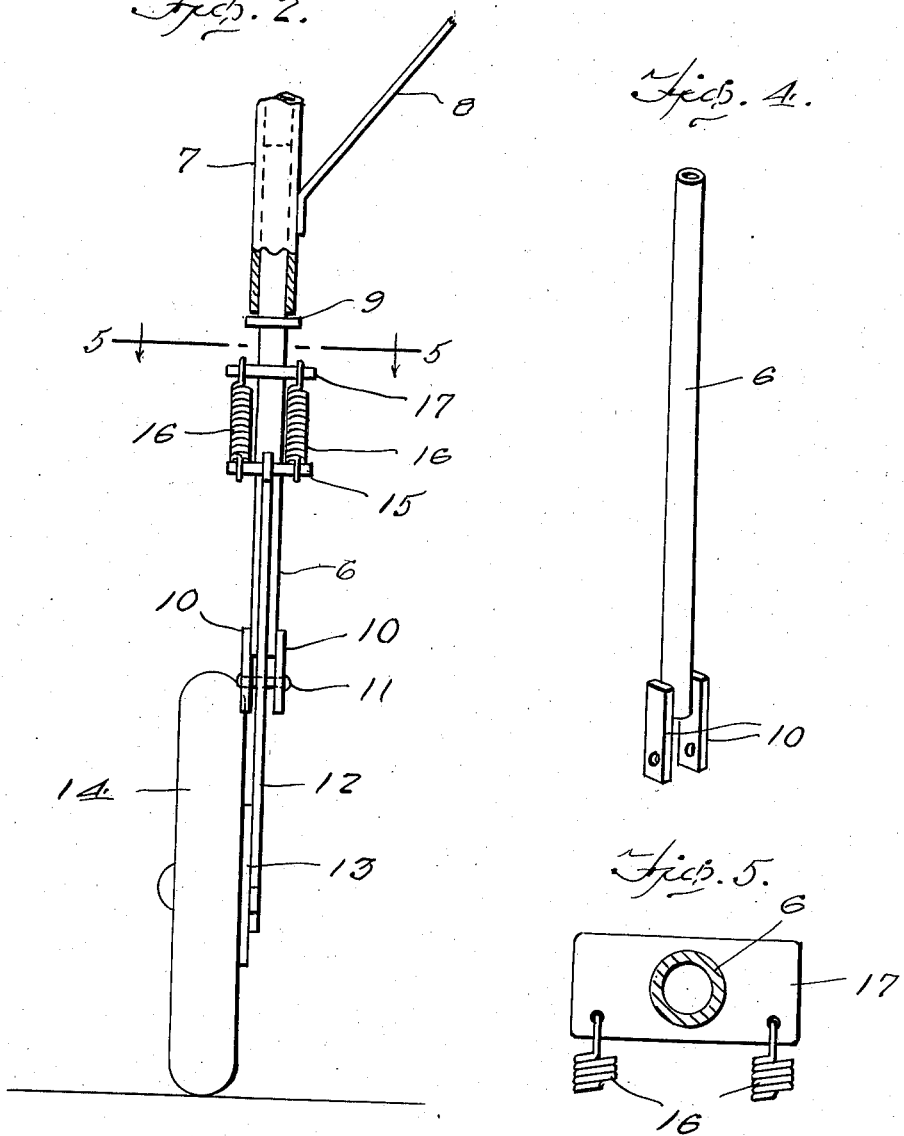

June 27, 1939.    L. J. PFISTER    2,163,850
AGRICULTURAL MACHINE
Filed Sept. 13, 1938    3 Sheets-Sheet 3
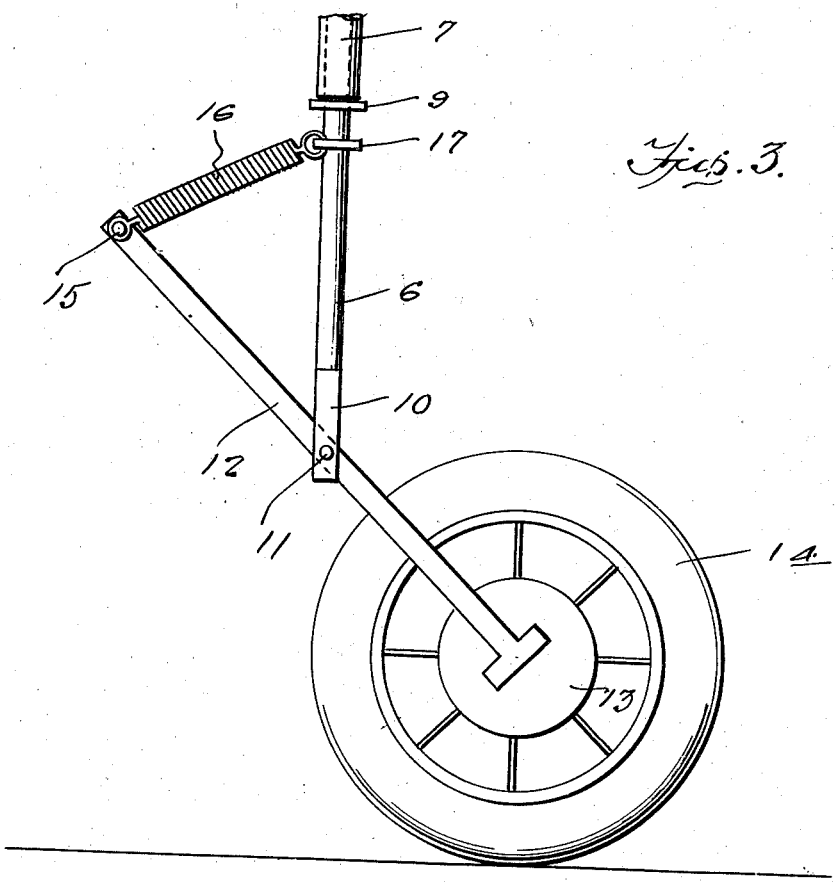
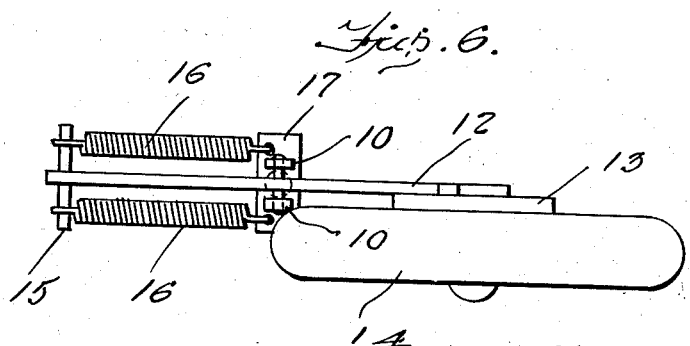
Inventor
L. J. Pfister
By Clarence A. O'Brien
and Hyman Berman
Attorneys Patented June 27, 1939

2,163,850

UNITED STATES PATENT OFFICE 2,163,850

AGRICULTURAL MACHINE

Lester J. Pfister, El Paso, Ill.

Application September 13, 1938, Serial No. 229,777

1 Claim. (Cl. 16—44)

This invention relates to agricultural machines and more particularly to a machine adapted to move under its own power through a field of corn and which embodies a novel construction and arrangement for supporting a number of workers in a manner to permit the tassels of a plurality of rows of corn to be removed simultaneously.

The present invention embodies certain new and useful improvements over the agricultural machine forming the subject matter of Patent No. 2,095,007, granted to me under date of October 5, 1937, and entitled "Agricultural machine".

More particularly the present invention has reference to an improved wheel support for such machine.

The invention together with its objects and advantages will be best understood from a study of the following description taken in connection with the accompanying drawings wherein:

Figure 1 is a view in front elevation illustrating the invention.

Figure 2 is a front elevational view of the wheel assembly with certain parts broken away and shown in section.

Figure 3 is a side elevational view of the ground wheel assembly.

Figure 4 is a perspective view of a rod forming part of the assembly.

Figure 5 is a sectional view taken substantially on the line 5—5 of Figure 2, and Figure 6 is a bottom plan view of the wheel assembly.

Referring to the drawings by reference numerals it will be seen that the reference numeral 1 indicates a motor driven carrier of narrow gauge and having rubber tire-equipped front and rear wheels arranged as shown.

Rising from the carrier 1 are uprights 2 on which is mounted a transversely elongated horizontal frame 3.

Suitably suspended from the frame 3 are platforms 4.

In actual practice the machine travels through a field of growing corn, the carrier 1 passing between two rows and the platforms 15 passing between other rows. Thus it will be seen that tassels may be rapidly removed from a plurality of rows of corn simultaneously by workmen occupying the platforms 15. If desired the tassels may be removed from the inner most rows of corn by workmen standing on the carrier 1.

The machine as thus described is substantially identical with the machine described in my aforementioned patent.

A salient feature of the present invention is in the provision of wheel assemblies 5 for supporting the outer ends of the frame 3. In accordance with the present invention each wheel assembly 5 embodies a tubular rod 6 that is telescoped within the lower end of a tubular member 7 depending from the frame 3 and braced relative to the frame through the medium of braces 8. The rod 6 is provided with a collar 9 that abuts the lower end of the tubular member 7 to limit upward movement of the rod 6 relative to the member 7.

On the lower end thereof the rod 6 is provided with a pair of spaced parallel coextensive lugs 10 between which is pivoted as at 11 a lever 12. One end of the lever 12 is suitably secured to the axle housing 13 of a ground wheel 14. On the upper end thereof the lever 12 is provided with a cross-arm 15 with which are engaged coil springs 16 that are also engaged with a fixed plate 17 provided on the rod 6 below the collar 9.

It will thus be seen that the springs 16 normally act to exert an upward pull on the lever 12 thus urging the wheel 14 into engagement with the ground.

Manifestly the wheels 14 materially assist in supporting the outer end portions of the frame 3 and the resilient mountings of the wheels permit the same to pass readily over any irregularities or obstructions that are encountered.

It is also apparent that the rods 6 are free to turn with the tubular members 7 so that substantially a swivel mounting, as well as a resilient one is provided for each wheel 14.

It is thought that a clear understanding of the construction, utility and advantages of an invention of this character will be had without a more detailed description thereof.

Having thus described the invention what is claimed as new is:

Frame supporting means comprising a vertically arranged tubular member, having its upper end connected with the frame, a rod vertically arranged and having its upper part slidably and rotatably supported in said depending member, a collar on the rod engaging the lower end of the tubular member for limiting upward movement of the rod, spaced depending ears at the lower end of the rod, a lever having an intermediate part pivoted between the ears, a horizontal spindle carried by one end of the lever and extending at right angles to the lever, a wheel rotatably arranged on the spindle, a cross arm at the other end of the lever, a cross plate carried by the rod below the collar and springs connecting the plate with the cross arm and tending to move the lever in a direction to press the wheel against the ground.

LESTER J. PFISTER.